United States Patent [19]

Lillelund et al.

[11] Patent Number: 5,547,275
[45] Date of Patent: Aug. 20, 1996

[54] SHAKER AND BLENDER

[75] Inventors: Stig Lillelund, Garderhøjvej; Jakob Heiberg, Gronnevaenge, both of Denmark; Robert H. C. M. Daenen, Bruckersebaan, Belgium

[73] Assignee: Dart Industries Inc., Deerfield, Ill.

[21] Appl. No.: 516,200

[22] Filed: Aug. 17, 1995

[51] Int. Cl.[6] .................................. B01F 15/00
[52] U.S. Cl. ........................ 366/130; 215/DIG. 8; 366/347
[58] Field of Search ........................ 366/129, 130, 366/347, 348, 349, 341, 336, 337, 340, 184, 219; 215/386, 390, DIG. 8

[56] References Cited

U.S. PATENT DOCUMENTS

| | | |
|---|---|---|
| D. 143,661 | 1/1946 | Keny . |
| D. 181,143 | 10/1957 | Gundelfinger . |
| D. 345,073 | 3/1994 | Carlson . |
| 1,201,284 | 10/1916 | Gilchrist . |
| 2,592,485 | 4/1952 | Stair . |
| 2,744,631 | 5/1956 | Toomds ........................ 215/386 |
| 3,074,263 | 1/1963 | Farmer . |
| 3,677,524 | 7/1972 | Douglas . |
| 3,685,803 | 8/1972 | Proctor ........................ 366/130 |
| 3,820,692 | 6/1974 | Swett et al. . |
| 4,193,698 | 3/1980 | Gartner ........................ 366/130 |
| 4,614,437 | 9/1986 | Buehler ........................ 215/390 |
| 4,818,114 | 4/1989 | Ghavi . |
| 4,916,672 | 4/1990 | McCrory . |
| 5,065,908 | 11/1991 | Mengeu ........................ 215/386 |

*Primary Examiner*—Robert W. Jenkins
*Attorney, Agent, or Firm*—John A. Doninger

[57] ABSTRACT

A shaker for flowable foodstuffs including a reversible blender insert seatable within the upwardly opening enlarged mouth of the shaker vessel and retained, in either position, by an overlying releasable snap-locked pouring spout, the assembly being closed by an overlying threaded cap. The blender insert, in a first position, defining a filter for retaining enlarged matter during pouring, and in the second position, in conjunction with the pouring spout, an enlarged upper mixing chamber.

14 Claims, 3 Drawing Sheets

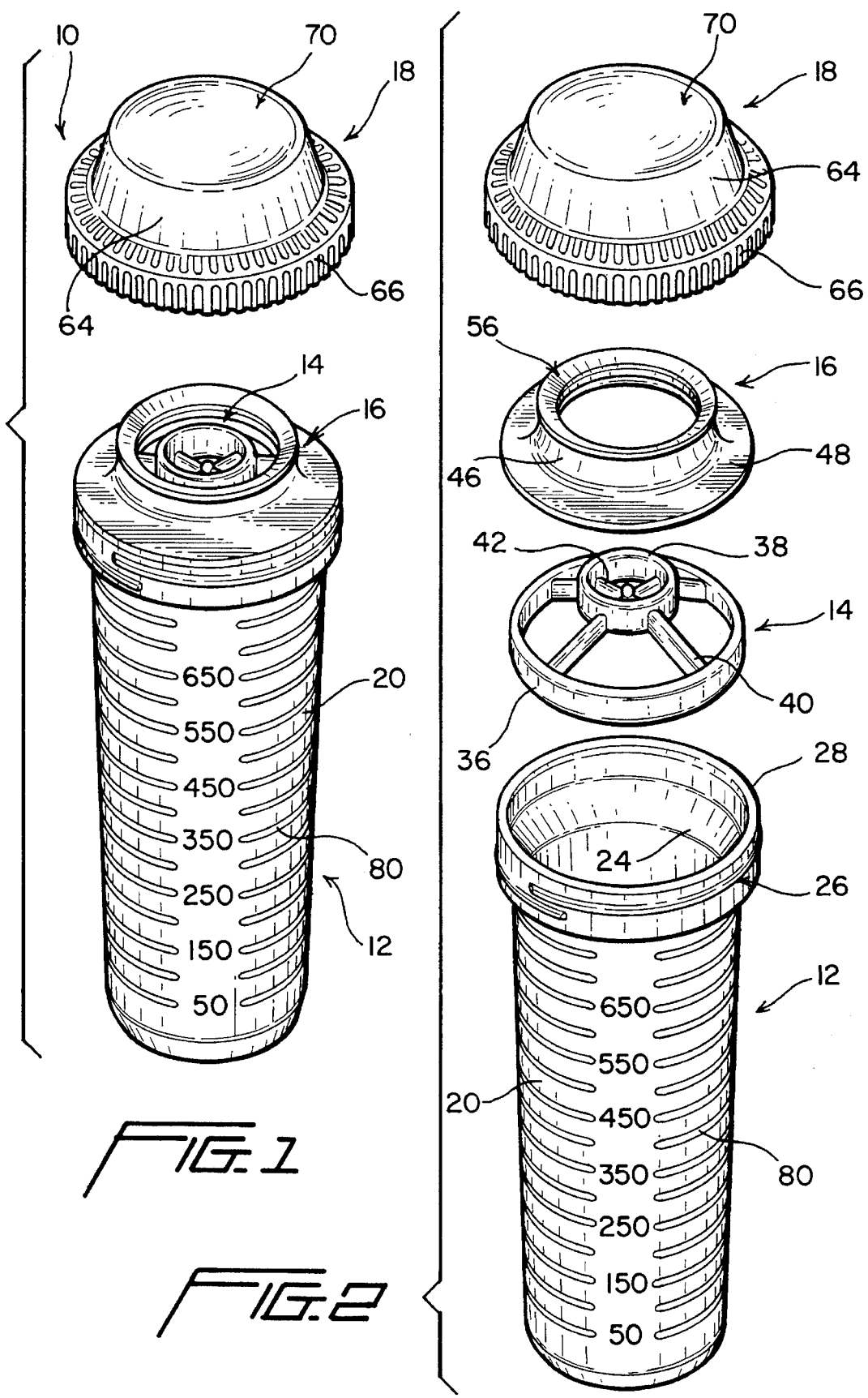

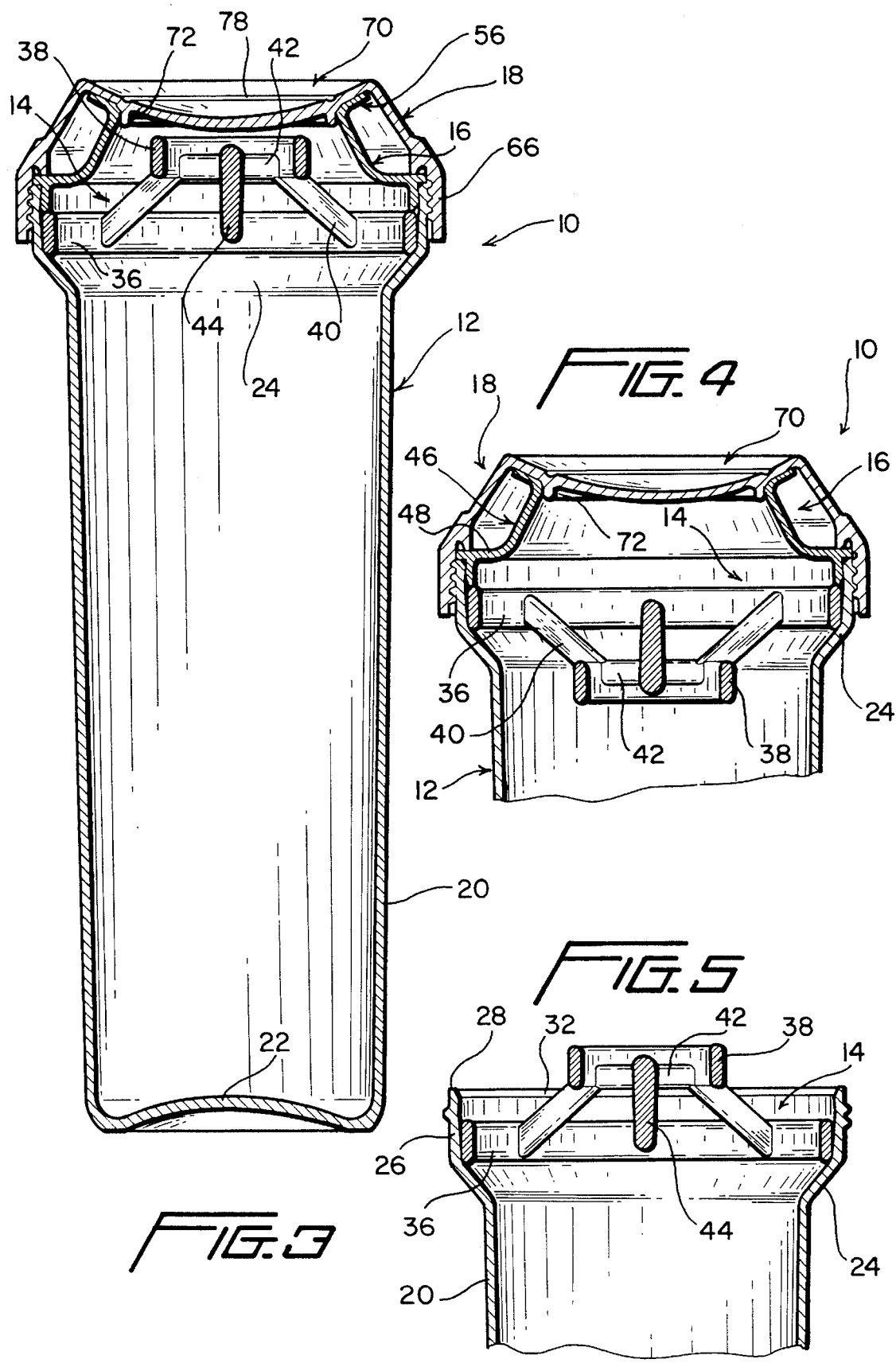

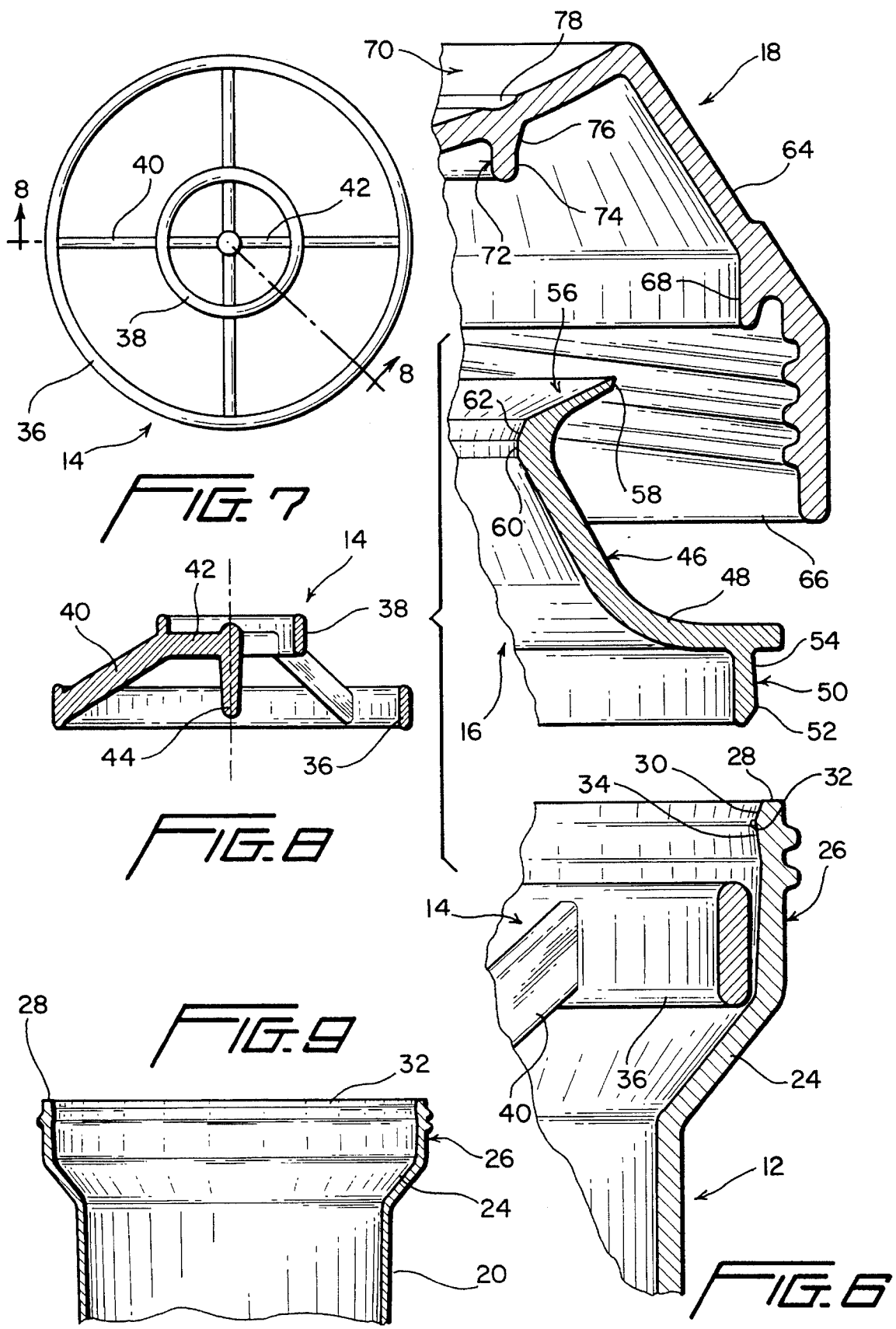

SHAKER AND BLENDER

BACKGROUND OF THE INVENTION

Hand-held shakers and/or blenders for liquid or liquidized foodstuffs are well known in the art, most comprising vertically elongate containers with removal covers or caps sealed thereto. A number of such shakers include inserts for encouragement of the shaking or blending operation. One example of such a shaker which has proved to be quite popular with consumers is that illustrated in U.S. Pat. No. 3,820,692, issued to Swett et al on Jun. 28, 1974, and assigned to the assignee of the present invention.

SUMMARY OF THE INVENTION

The shaker and blender of the invention is intended to improve on the basic shakers of the prior art in appearance, ease of one-handed handling and manipulation, and effectiveness with a wide range of flowable foodstuffs from relatively viscous batters, sauces, omelets, pancakes and the like, to relatively non-viscous liquids, such as mixed drinks and vinegarette dressings.

In achieving these goals, the combined shaker and blender, which also functions as a storage container and liquid dispenser, comprises a vertically elongate vessel of cylindrical configuration with a minimal downward taper of approximately one degree. The bottom of the vessel is upwardly domed and the upper portion of the vessel outwardly flared at approximately 40°degrees to the vertical, terminating in an upwardly extending externally threaded cylindrical mounting collar, thereby defining a readily graspable body with an enlarged chamber-defining upper portion and an upwardly opening mouth.

A blender insert is reversibly received within this upper vessel chamber and includes an outer ring member supported within the chamber and a coaxial laterally offset inner ring member with inclined radially extending ribs or spokes between the ring members and a second plurality of radial ribs or spokes within the inner ring member extending to an axially positioned support pin.

The blender insert is retained by an overlying removable pouring spout which peripherally seats on the upper edge of the upper vessel chamber and includes a depending skirt downwardly snap latching to the vessel collar and engaging against the outer annular ring of the blender insert. The pouring spout has a frustoconical body terminating in a rather abrupt outwardly flaring pouring flange or lip with a "drip-proof" outer edge.

The shaker is completed by a closure cap or cover including a conical body with a depending internally threaded peripheral skirt for engagement with the vessel collar. An inner annular rib on the cap is engageable with the pouring spout for a downward retention thereof in sealing engagement with the vessel. The cap also has a top panel with a concave depression therein nesting within the mouth of the pouring spout defined by the outwardly flared upper flange or lip of the pouring spout. An integral depending ring on the top panel sealingly engages, through mating inclined flat surfaces, within the open mouth of the pouring spout.

In the blending of viscous products, the blender insert will be oriented with the inner annular ring extending downward toward the interior of the vessel to provide a maximum mixing and flow area or chamber defined by the enlarged upper portion of the vessel and the overlying cover and pouring spout.

For non-viscous or relatively non-viscous liquids, such as mixed drinks, vinegarette dressings, and the like, the blender insert will be inverted with the central annular ring extending upwardly to a point just below and centrally of the mouth of the pouring spout to produce a mixing effect as the shaker is agitated, and also function as a retainer for ice cubes, whole herbs as in salad dressings, and other such liquids wherein larger components are to be separated from the poured liquid.

The cap has a relatively low profile which, while allowing for a substantial upper mixing chamber with the blender insert downwardly directed, is attractive in appearance and more easily stored on refrigerator shelves and the like.

The shaker/blender, while not limited thereto, is preferably formed of a food-compatible synthetic resinous material such as polypropylene.

Other features and advantages of the invention will become apparent from the more detailed description following hereinafter.

BRIEF DESCRIPTION OF THE DRAWINGS

FIG. 1 is a perspective view of the shaker with the cap exploded;

FIG. 2 is an exploded perspective view of the basic four components of the shaker;

FIG. 3 is a vertical cross-sectional view through the assembled shaker;

FIG. 4 is a cross-sectional detail of the upper portion of the assembled shaker with the blender insert inverted;

FIG. 5 is a cross-sectional detail of the upper portion of the shaker with the cap removed and the blender insert as in FIG. 3;

FIG. 6 is a cross-sectional detail through the upper portion of the shaker with the cap and pouring spout upwardly exploded;

FIG. 7 is a top plan view of the blender insert with the inner annular ring upwardly directed;

FIG. 8 is a cross-sectional view through the blender insert substantially on line 8—8 in FIG. 7; and FIG. 9 is a cross-sectional view through the upper end portion of the shaker vessel.

DESCRIPTION OF PREFERRED EMBODIMENT

The combined shaker and blender 10 of the present invention, hereinafter referred to by the generic term "shaker" includes four basic components, a vessel or container 12, a blender insert 14, a pouring spout 16 and a closure cap or cover 18.

The vessel 12 is of a vertically elongate cylindrical configuration with the wall 20 thereof tapering inwardly toward the bottom at an angle of approximately one degree. The integral bottom 22 of the vessel is upwardly domed to define an inner convex surface which will encourage a mixing action as the shaker is agitated.

The upper portion of the vessel wall 20 is outwardly flared, peripherally thereabout, at approximately 40° degrees to the vertical, defining an increasingly widening transition area 24 providing, toward the upper portion thereof, a support surface or shoulder for the blender insert as shall be described subsequently. A cylindrical externally threaded collar 26 is integrally formed with the transition area 24 and extends vertically thereabove to a height slightly greater than that of the transition area 24. The transition area 24 and vessel collar 26 define an upwardly opening mouth portion and upper vessel chamber with a diameter, at the collar 26, substantially greater than the diameter of the vertically elongate main portion of the vessel 12 therebelow, for example on the order of approximately 50 percent greater.

With particular attention to the externally threaded vessel collar 26, the inner surface thereof, immediately below the planar upper edge or rim 28, is downwardly and inwardly beveled, relative to the interior of the collar, as at 30, to define an annular inwardly directed ridge 32. Immediately below the ridge 32, the inner surface of collar 26 is outwardly inclined, relative to the interior of the collar, to define a vertically elongate tapered undercut surface 34 below the ridge 32. Below this undercut portion 34, the inner surface of the collar 26 slopes inward at a slight angle of approximately 2.50 degrees to define a guide surface for the introduction of the blender insert.

The blender insert 14 includes coaxial outer and inner annular rings 36 and 38 with the inner ring 38 laterally offset from the outer ring 36 with a vertical space defined therebetween.

The outer ring 36 has an external diameter which allows it to be closely although freely received within the vessel collar 26 for seated engagement on the shoulder-defining upper portion of the outwardly tapered transition area 24. The outer ring 36, and hence the blender insert 14 itself, is guided into seated position by the slightly downwardly tapering inner surface of the collar 26 below the ridge undercut portion 34. The height of the outer ring 36 is slightly less than that of the height of the corresponding inner surface of the vessel collar below the ridge 32 and undercut portion 34 thereof.

The inner annular ring 38, which is of less than half of the diameter of the outer annular ring 36, is of substantially equal height therewith.

The outer and inner rings 36 and 38 are integrally joined by a plurality of radially extending ribs or spokes 40 which incline at approximately 32° degrees to the horizontal. Preferably four such spokes are provided at 90° degree spacings and, while of less height than the rings 36 and 38 in cross-section, are of similar configuration.

Noting the blender insert 14 positioned with the inner annular ring 38 upwardly directed as in FIGS. 3, 5 and 8, the outer ends of the spokes 40 join the inner surface of the outer ring 36 vertically centrally thereof. The inner ends of the spokes 40 join the outer surface of the inner ring 38 at the lower portion thereof, blending with the lower edge of this inner ring.

A plurality, of spokes 42, preferably four, also extend radially inward from the inner ring 38, preferably aligned with the outer spokes 40 and terminating in a central, vertically elongate substantially cylindrical pin 44. The inner ring spokes 42 integrally join the inner surface of the inner ring at the lower portion thereof, defining in effect, and noting FIG. 8 in particular, an angled and radial continuation of the inner ends of the outer spokes 40. The central pin 44 extends upward within the inner ring 38 to a height above the inner spokes 42 and below the outer annular edge of the ring 38. The opposite end portion of the pin 44 extends to approximately mid height on the outer annular ring 36, thus providing, in the inverted position of the blender insert 14 as in FIG. 4, a means for readily grasping the insert for placement and removal.

In order to encourage a blending smooth flow of fluidized material thereabout, the upper and lower edges of all of the elements of the blender insert are slightly rounded. In addition, and in the blender insert position of FIG. 3, the outer side surfaces of the rings and spokes taper downwardly at approximately one degree which may encourage circulation.

The pouring spout 16 includes an upwardly directed frustoconical body 46 having an outwardly flared lower portion 48, the outer periphery of which is coextensive with the outer periphery of the vessel collar 26 so as to seat directly on the upper edge 28 and in close conformance thereto. The pouring spout also includes an integral depending annular collar 50 inwardly spaced from the peripheral portion engaging the upper edge 28 a sufficient distance as to intimately engage against the inner ridged surface of the collar 26 of the vessel. The pouring spout collar is of a height as to, upon a full seating of the pouring spout on the upper vessel edge 28, engage against the uppermost edge of the outer ring 36 of the blender insert 14 for a retention of the blender insert in either of its two operative positions. The outer surface of the pouring spout collar 50 is configured to define a circumferential enlargement 52 which, with the sloping surface 54 thereabove, conforms to the undercut portion 34 of the vessel collar 26, thereby providing for a releasable snap locking of the pouring spout to the vessel collar.

The upper portion of the frustoconical spout is outwardly turned at a rather sharp angle of approximately 27.50 degrees to the horizontal to form a pouring lip terminating at a thin undercut outer edge 58 formed at approximately 10 degrees to the vertical.

At the broadly arcuate inner surface area between the frustoconical body 46 and the pouring lip 56, the inner surface includes an annular vertical extent 60 immediately above the inner conical surface. This surface portion 60 can be slightly undercut, on the order of one degree. Immediately above the surface portion 60 is a further outwardly inclined surface portion 62 at approximately 20 degrees to the vertical, with both surface portions 60 and 62 defining a generally arcuate annular transition area between the conical body 46 and pouring lip 56.

The cap 18 includes a frustoconical central or body portion 64 with an integral depending cylindrical skirt 66 thereon. The skirt is formed with internal threads which engage with the external threads on the vessel collar 26. Immediately radially inward of the internally threaded skirt is a depending rib 68 generally paralleling the skirt and aligned over the peripheral edge portion of the pouring spout 16 for downward engagement thereagainst as the cap 18 is threaded into its closed position. The engagement is such as to provide for a sealing engagement between the pouring spout and the upper edge 28 of the vessel collar 26. As will be recognized, the lid 18 will effectively seal to the vessel even in the absence of the blender insert 14.

The tapered or conical body 64 of the cap extends at approximately 57.27 degrees to the horizontal and generally parallels the tapered body 46 of the pouring spout to provide a low profile. The upper end of the body terminates in a downwardly dished or concaved top panel 70 which is turn has an integral annular depending ring 72 which is snugly received within the pouring spout mouth immediately inward of the pouring lip 56. The ring 72 has a pair of planar angularly related outer surfaces 74 and 76 which, upon a full seating of the cap, closely conform to the spout transition surfaces 60 and 62 to define a positive seal therewith against accidental discharge of the container contents. In addition, the undersurface of the top panel 70, annularly about and radially outward of the ring 72, is formed and configured to intimately engage against the upper surface of the pouring spout lip 56 inwardly from the drip-proof undercut edge 58 thereof.

To provide a slight degree of flexure to the top panel in the area of engagement with the pouring spout mouth, the top panel upper surface, in general alignment with the depending sealing ring 72, is slightly thinned or grooved as at 78 to encourage proper seating.

To facilitate manipulation of the cap, the exterior of the skirt 66 thereof, as well as the lower portion of the tapered body 64, is provided with a series of vertical flutes best illustrated in FIGS. 1 and 2.

Turning again to the vessel 12 itself, it is contemplated that the wall 20 thereof be translucent or opaque with the marked calibration bands 80 transparent for a clear view of the liquid level therethrough. The numerical indicators can be either transparent or of a dark color which, in combination with the transparent bands, provides a particularly pleasing appearance encouraging use of the shaker as an actual serving container at the table.

In use, the reversible blender is significant in adapting the shaker for the accommodation of both relatively viscous materials and relatively non-viscous materials. Noting FIG. 3, the blender insert is positioned in a manner deemed most suitable for relatively non-viscous materials such as mixed drinks, vinegarette dressings, and the like. So positioned, the actual liquid contents can freely flow about the blender insert as the container is shaken. More importantly, with non-viscous materials, when the liquid is to be poured from the container, the blender insert will effectively retain and act as a strainer to prevent discharge of ice cubes, whole herbs, and the like. Such items, due to the upwardly converging outer spokes 40 will tend to move toward the inner annular ring 38 and collect thereat while the liquid smoothly flows around the blender between the inner and outer rings and out of the pouring spout. As an additional restriction to the outflow of large items, it will be noted that the inner ring 38 is positioned in close vertical and circumferential proximity to the pouring spout mouth.

Referring to FIG. 4, the inverted blender insert 14 is positioned to accommodate and effectively blend relatively viscous materials. So positioned, the blender insert tends to direct the flow, upon a shaking of the container, upwardly through the outer or wider portion of the blender insert into the now enlarged mixing chamber defined between and with the upwardly directed cone of the pouring spout and the downwardly directed cone of the blender insert. The flow subsequently tends to move downwardly and inwardly, guided by the inverted dome of the cap top panel, and the inwardly and downwardly inclined outer spokes 40, through the inner annular ring 38 and the spokes therein. A pouring of the blended relatively viscous material from the container will be easily effected through the inverted blender, principally through the outer portion of the blender insert between the inner and outer annular rings.

The foregoing described embodiment is illustrative of the invention, and as other embodiments incorporating the inventive features of the invention may occur to those skilled in the art, the disclosed embodiment is not to be considered as a limitation on the scope of the invention.

We claim:

1. A shaker for flowable foodstuffs comprising an upwardly opening vessel having a bottom, a peripheral wall integral with said bottom and extending upward therefrom and terminating in an upwardly opening mouth portion including an annular collar, said collar having an upper rim, upwardly directed support means within said mouth portion, a blender insert removably positioned within said mouth portion, said blender insert having flow blending components and including an outer peripheral edge portion engageable on said support means for support of said blender insert within said mouth portion, a pouring spout removably mounted in an assembled position over said mouth portion in overlying relation to said blender insert, said pouring spout including an edge portion seating on said upper rim and a depending radially inward portion engageable with said outer peripheral edge portion of said blender insert to retain said blender insert against said support means, and cooperating retaining means on said mouth portion and said pouring spout for releasably retaining said pouring spout in said assembled position, said pouring spout having an upper pour opening defined by a surrounding pouring lip, and a cap mountable over said pouring spout, said cap including a depending skirt positionable about said collar, releasable locking means on said skirt and collar for releasably locking said cap to said collar, said cap including means for sealing said pour opening upon a mounting of said cap in a closed position over said pouring spout.

2. The shaker of claim 1 wherein said blender insert includes a central portion laterally offset from said outer peripheral edge portion thereof, said blender insert being reversible with said central portion selectively oriented in a first position extending vertically outward relative to said vessel mouth portion, and a second position extending vertically inward relative to said vessel mouth portion.

3. The shaker of claim 2 wherein said blender insert is of a generally conical configuration with said outer peripheral edge portion defined by an outer annular ring, and said central portion comprising an inner annular ring coaxial with and of a substantially smaller diameter than said outer annular ring, said flow blending components of said blender insert comprising said inner annular ring, a vertically elongate pin coaxially positioned within said inner ring, a plurality of inner spokes extending radially outwardly from said inner pin to said inner annular ring, and a plurality of outer spokes extending radially and at a converging incline from said outer annular ring to said inner annular ring.

4. The shaker of claim 3 wherein said pouring spout is of a generally conical configuration generally conforming to the configuration of said blender insert in said first position thereof, said blender insert, in said first position, defining a filtering unit for controlling outward flow through said pouring spout pour opening.

5. The shaker of claim 4 wherein said blender insert, in said second position thereof, forms, with said overlying pouring spout, an enlarged mixing chamber conically converging upward into said pouring spout and downward into said blender insert for a mixing and circulating flow of a flowable foodstuff upon an agitation of the shaker.

6. The shaker of claim 5 wherein said pouring spout lip outwardly flares from said pour opening peripherally thereabout and terminates in an outer edge at an acute angle to said lip.

7. The shaker of claim 6 wherein said pouring spout, immediately inward of said pouring lip, includes an annular inwardly and downwardly inclined planar surface terminating in an annular vertical planar surface immediately therebelow, Said means on said cap for sealing said pour opening comprising a depending inner annular sealing ring on said cap and insertable within said pour opening upon a closing of said cap, said inner sealing ring including an outer surface with planar annular surface portions complementary to the planar surfaces on the pouring spout for intimate sealing engagement therewith.

8. The shaker of claim 7 wherein said cap includes a top panel with an arcuately depressed central portion having an inner surface portion, radially outward of said sealing ring, conforming to said pouring lip in the closed position of said cap.

9. The shaker of claim 8 wherein said cap, between said top panel and said skirt thereof, includes a conical portion outwardly of and generally paralleling said pouring spout, said cap, about said skirt thereof, having a gripping surface defined thereon.

10. The shaker of claim 2 wherein said pouring spout is of a generally conical configuration generally conforming to the configuration of said blender insert in said first position thereof, said blender insert, in said first position, defining a filtering unit for controlling outward flow through said pouring spout pour opening.

11. The shaker of claim 10 wherein said blender insert, in said second position thereof, forms, with said overlying pouring spout, an enlarged mixing chamber conically converging upward into said pouring spout and downward into said blender insert for a circulating flow of a flowable foodstuff upon an agitation of the shaker.

12. The shaker of claim 11 wherein said mouth portion is radially enlarged relative to said vessel therebelow, and includes, below said annular collar, an outwardly and upwardly inclined portion defining said support means and forming an inverted generally frustoconical mixing area directly communicating with and forming an extension of said mixing chamber.

13. The shaker of claim 1 wherein said pouring spout, immediately inward of said pouring lip, includes an annular inwardly and downwardly inclined planar surface terminating in an annular vertical planar surface immediately therebelow, Said means on said cap for sealing said pour opening comprising a depending inner annular sealing ring on said cap insertable within said pour opening upon a closing of said cap, said inner sealing ring including an outer surface with planar annular surface portions complementary to the surfaces about the pour opening on the pouring spout for intimate sealing engagement therewith.

14. The shaker of claim 13 wherein said cap includes a top panel with an arcuately depressed central portion having an inner surface portion, radially outward of said sealing ring, conforming to said pouring lip in the closed position of said cap.

* * * * *

UNITED STATES PATENT AND TRADEMARK OFFICE
CERTIFICATE OF CORRECTION

PATENT NO. : 5,547,275

DATED : August 20, 1996

INVENTOR(S) : Stig LILLELUND, Jakob HEIBERG, Robert H.C.M. DAENEN

It is certified that error appears in the above-identified patent and that said Letters Patent is hereby corrected as shown below:

On Sheet 1 of the drawings, replace FIGS. 1 and 2 with the following figures:

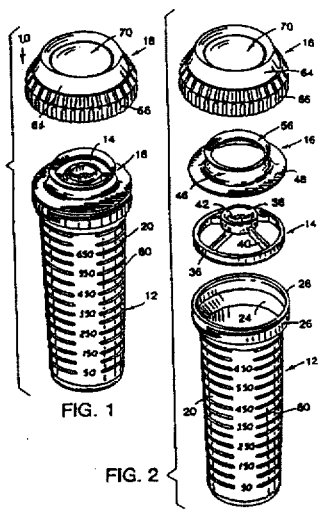

Signed and Sealed this

Sixteenth Day of March, 1999

Attest:

Q. TODD DICKINSON

Attesting Officer

Acting Commissioner of Patents and Trademarks